(12) United States Patent
Yu

(10) Patent No.: US 11,882,954 B2
(45) Date of Patent: Jan. 30, 2024

(54) FLOWER ARRANGEMENT SUPPORT SYSTEM

(71) Applicant: Youngsil Yu, Seoul (KR)

(72) Inventor: Youngsil Yu, Seoul (KR)

(*) Notice: Subject to any disclaimer, the term of this patent is extended or adjusted under 35 U.S.C. 154(b) by 105 days.

(21) Appl. No.: 17/620,118

(22) PCT Filed: Jun. 15, 2020

(86) PCT No.: PCT/KR2020/007685
§ 371 (c)(1),
(2) Date: Dec. 17, 2021

(87) PCT Pub. No.: WO2020/256361
PCT Pub. Date: Dec. 24, 2020

(65) Prior Publication Data
US 2022/0233002 A1    Jul. 28, 2022

(30) Foreign Application Priority Data

Jun. 19, 2019  (KR) .................. 10-2019-0072554

(51) Int. Cl.
*A47G 7/02*    (2006.01)

(52) U.S. Cl.
CPC .................... *A47G 7/02* (2013.01)

(58) Field of Classification Search
CPC ... A01G 5/00; A01G 5/04; A47G 7/02; A47G 7/04

(Continued)

(56) References Cited

U.S. PATENT DOCUMENTS 3,698,132 A * 10/1972 Green ............... A01G 5/04
                                                            220/628
7,017,298 B2 * 3/2006 Yu ..................... A47G 7/07
                                                            63/38

(Continued)

FOREIGN PATENT DOCUMENTS

KR           200325837        9/2003
KR         20050001814        1/2005

(Continued)

OTHER PUBLICATIONS

"International Search Report (Form PCT/ISA/210) of PCT/KR2020/007685," dated Oct. 22, 2020, with English translation thereof, pp. 1-5.

*Primary Examiner* — Peter M Poon
*Assistant Examiner* — Danielle A Clerkley
(74) *Attorney, Agent, or Firm* — Rabin & Berdo, P.C.

(57) ABSTRACT

The present invention relates to a flower arrangement support system for helping arranged flowers to maintain their shape. The flower arrangement support system includes a box-type frame having a provided on the upper surface of the box-type frame, a support means to support arranged flowers, and a connection means connected to both the box-type frame and the support means so as to prevent the support means from escaping from the box-type frame when the support means rotates. The support means has a first row, a second row, a third row, and an N-th row, and the first row, the second row, the third row, and the N-th row each include a plurality of rotating balls each having a through hole. The connection means is wound once around the rotating balls and includes a sliding member which is located in the box-type frame to be slidable vertically and has an accommodation space therein.

3 Claims, 3 Drawing Sheets

(58) Field of Classification Search
USPC .................................. 47/41.01, 41.11, 41.12
See application file for complete search history.

(56) References Cited

U.S. PATENT DOCUMENTS 7,832,141 B2 * 11/2010 Yu ............................ A01G 5/04
47/41.12
9,629,486 B2   4/2017 Allan

FOREIGN PATENT DOCUMENTS

| KR | 20070055070 | 5/2007 |
| KR | 20110004603 | 5/2011 |
| KR | 20130041535 | 4/2013 |

* cited by examiner

FLOWER ARRANGEMENT SUPPORT SYSTEM

CROSS-REFERENCE TO RELATED APPLICATION

This application is a 371 of international application of PCT application serial no. PCT/KR2020/007685, filed on Jun. 15, 2020, which claims the priority benefit of Korean application no. 10-2019-0072554, filed on Jun. 19, 2019. The entirety of each of the above mentioned patent applications is hereby incorporated by reference herein and made a part of this specification.

TECHNICAL FIELD

This invention is related to a suspension device for flower arrangements, more specifically, a suspension device for flower arrangements which helps to maintain the state of a flower arranged once as it is by winding up the rotating ball located at the forefront, the rotating ball located at the end, and the rotating ball located at regular intervals between the forefront and the end with a connecting means to enhance its tensile force, and by making sure that the rotating balls cannot be rushed to the floor when the suspension means rotates.

BACKGROUND ART

Generally, flower arrangement means decorating the surroundings more beautifully by putting flowers in a needle valve of water glasses or a floral foam (an alias, oasis) of baskets in various forms, and has been used for congratulations and condolences such as wedding, opening ceremony, graduation ceremony, commemoration, event, party, etc. Thus, a job as a florist who is specialized in enhancing the added value at the final consumption stage of flowers by producing them in a proper and beautiful form for their purposes has been emerging as a prospective job in the modern society in which a sense of beauty is pursued due to the progress of civilization.

In addition, in order to reflect such needs of consumers and the characters of the age, the florists have developed/researched various forms of flower arrangements, and accordingly, have developed/researched various devices of flower arrangements with which they can fix flowers at the angles that they want to arrange them.

However, the flower arrangement devices that had been used in the past were supposed for the florists to arrange flowers by using needle valves or floral foam, and thus, all of them were set to be arranged on a flat surface. Namely, they were set for the florists to determine various angles and lengths by using the length of flower stalks, centering on a fixing means located at the lower part. However, such flower arrangement design had a limitation in making a design that the florists want to attempt because the fixing means of flower stalks is located at the lower part, and also had the problem that it is impossible for the florists to freely express the beauty of flowers due to this.

And, for both of needle valves or floral foam, the flower arrangement design had a limitation to the number of the flowers that the florists can express because they had to arrange flowers by using the planar parts and very narrow sizes that they can fix flowers. Of course, for the floral foam, it is possible to use the sides, however, considering the bearing power of the flowers to be put and also considering the fact that it is impossible to put many flowers in the sides, it also had a limitation to the number of the flowers to be used for flower arrangements.

And, for both of needle valves or floral foam, the planar parts are usually used for flower arrangements, and thus, it is easy for the florists to produce an aesthetic sense unidirectionally or bilaterally (antero-posterior direction), however, it was difficult to produce the beatify of flower arrangements in all directions.

And, only the lower parts of the flower stalks were subject to be inserted into the needle valves or floral foam and then fixed therein, and if a flower stalk is long, its bearing power deteriorates, and if a flower stalk is short, it had the risk that the user may hurt his/her hand(s) due to needle valves, etc.

And, the traditional three-dimensional shaped suspension device for flower arrangements that was used in the past has been produced/used separately according to necessary purposes, for example, flower arrangements for table decoration, flower arrangements for wall decoration, flower arrangements for condolence flowers, etc., and these flower arrangements were subject to form many holes according to necessary angles (angles according to which flowers are arranged) or to fix only the end portion of flower stalks by just inserting a material such as floral foam within a certain form of frame. Namely, there were various kinds of problems, for example, it needed separate devices for flower arrangements according to their necessary purposes; and their production costs and purchasing expenses increased; and due to this, the economic burden was increased accordingly.

In order to solve the above-mentioned problems, an application for the subject invention was filed before the Korean Intellectual Property Office (KIPO) on Jun. 26, 2003 (Application No. 20-2003-0020352; Name of the Invention: Three-Dimensional Shaped Device for Flower Arrangements), and its scope of the patent claims was described as follows: "a three-dimensional shaped device for flower arrangement which has the characters that it forms the row of the rotating balls by connecting many rotating balls with elastic connecting means; that the row of the upper rotating balls and the lower rotating balls are installed in layers, respectively so that the above-mentioned row of the many rotating balls are parallel to each other; and that it has been equipped a three-dimensional shape by connecting the many suspending parts that have been installed so that the rows of the rotating balls of the upper/lower parts can be crossed to each other."

However, for the traditional three-dimensional shaped suspension device for flower arrangements that was used in the past, the rotating balls are just inserted continuously to the connecting means as indicated in the FIG. 1.

Thus, it had the problem that the rotating balls are frequently rushed into the floor all at once if the rotating balls rotate and they are disconnected to the connecting means.

Due to this, it had cumbersome problems that the florists had to make the above-mentioned three-dimensional shaped suspension device for flower arrangements again and also had to put flower in the ready-made three-dimensional shaped suspension device for flower arrangements.

DETAILED DESCRIPTION OF THE INVENTION

Technical Task

Therefore, the subject invention has been developed in order to solve the problems due to the above-mentioned traditional technologies, and the purpose of the subjection invention is to provide the suspension device for flower arrangements which helps to maintain the state of a flower arranged once as it is by winding up the rotating ball located at the forefront, the rotating ball located at the end, and the rotating ball located at regular intervals between the forefront and the end with a connecting means to enhance its tensile force, and by making sure that the rotating balls cannot be rushed to the floor when the suspension means rotates.

However, the purpose of the subject invention shall not be limited to the purposes as described above, and the person skilled in the relevant field of technology is able to clearly understand the other purposes that have not yet been mentioned above from the descriptions as indicated below.

Means for Solving Problems

The suspension device for flower arrangements according to the subject invention to achieve the above-mentioned purposes include, the box-typed frame (102) equipped with a space within it;

the suspension means (104) to support the flower to be installed and arranged on the upper part of the aforesaid box-typed frame (102);

and the connecting means (106) to make sure that it cannot be separated from the box-typed frame (102) when the suspension means (104) rotates, with it being connected with both the aforesaid the box-typed frame (102) and the suspension means (104);

in which, the aforesaid suspension means (104) is composed of the first row, second row, third row, . . . , nth row, the first row, second row, third row, . . . , and nth row have many rotating balls (108) equipped with through tubes, the aforesaid connecting means (106), once winds up the rotating ball (108) located at the forefront of the first row, second row, third row, . . . , nth row, the rotating ball (108) located at their end, and the rotating ball (108) located at regular intervals between their forefront and end, The suspension device for flower arrangements according to the subject invention to achieve the above-mentioned purposes include, the box-typed frame (102) equipped with a space within it;

The aforesaid sliding member of framework (200) includes, the suspension means (104) to support the flower to be installed and arranged in the space of the above-mentioned sliding member of framework (200);

and the connecting means (106) to make sure that it cannot be separated from the sliding member of framework (200) when the suspension means (104) rotates, with it being connected with both the aforesaid sliding member of framework (200) and the suspension means (104).

Effect of the Subject Invention

As detailed above, the suspension device for flower arrangements according to the subject invention has an effect to enhance the tensile force by once winding up the rotating ball located at the forefront, the rotating ball located at the end, and the rotating ball located at regular intervals between the forefront and the end with a connecting means.

Especially, the subject invention has an effect to maintain the state of a flower arranged once as it is by once winding up the rotating ball located at the forefront, the rotating ball located at the end, and the rotating ball located at regular intervals between the forefront and the end with a connecting means to enhance its tensile force, and by making sure that the rotating balls cannot be rushed to the floor when the suspension means rotates.

SIMPLE EXPLANATIONS ABOUT THE DRAWINGS

THE BEST FORM FOR IMPLEMENTING THE INVENTION

Hereinafter, a desirable executed example of the suspension device for flower arrangements according to the subject invention is to be explained.

In explaining about the subject invention as indicated below, the detailed explanations will be omitted when it is judged that the specific contents of the relevant announced functions or compositions may unnecessarily obscure the key points of this invention.

Figure 1:
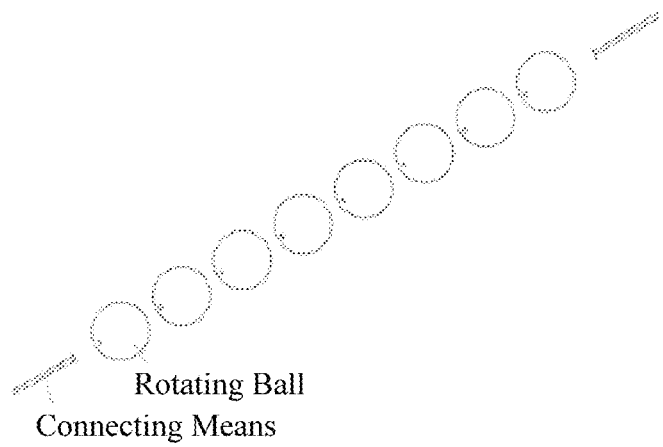
FIG. 1 is a drawing which depicts the state where the rotating balls are inserted into the connecting means in the traditional three-dimensional shaped suspension device for flower arrangements.
Figure 2:
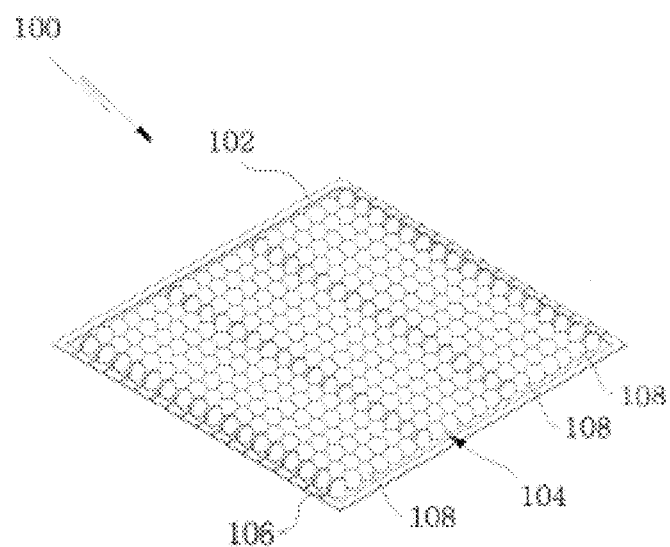
FIG. 2 is a drawing which depicts the suspension device for flower arrangements according to the subject invention.

FIG. 2 is the drawing which depicts the suspension device for flower arrangements according to the subject invention.

As depicted in the FIG. 2, the suspension device for flower arrangements according to the subject invention includes, the box-typed frame (102) equipped with a space within it;

the suspension means (104) to support the flower to be installed and arranged on the upper part of the aforesaid box-typed frame (102);

and the connecting means (106) to make sure that it cannot be separated from the box-typed frame (102) when the suspension means (104) rotates, with it being connected with both the aforesaid box-typed frame (102) and the suspension means (104).

Here, the aforesaid suspension means (104) is composed of the first row, second row, third row, . . . , nth row, the first row, second row, third row, . . . , and nth row have many rotating balls (108) equipped with through tubes.

And, the aforesaid connecting means (106), once winds up the rotating ball (108) located at the forefront of the first row, second row, third row, . . . , nth row, the rotating ball (108) located at their end, and the rotating ball (108) located at regular intervals between their forefront and end.

A form for Implementing the Invention.

The assembly process and use state of the flower arrangement support apparatus (100) according to the present invention included as described above will be described as follows.

Here, the assembly process of the flower arrangement support apparatus (100) according to the present invention may be changed as much as possible depending on the assembly.

First, locate the frame (102) equipped with a space within it.

And, locate the connecting means such as string or thread, and then connect an end portion of the above-mentioned connecting means (106) with a side of the frame (102).

And, locate the suspension means (104) to support flowers to be arranged in a space of the frame (102).

And, connect the suspension means (104) with the above-mentioned connecting means (106), and then connect an end portion of the above-mentioned connecting means (106) with a side of the frame (102).

Figure 3:
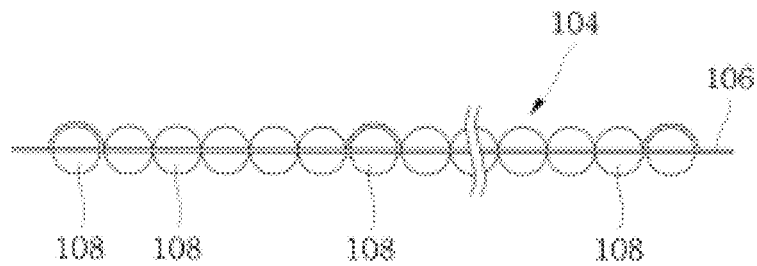
FIG. 3 is the main sectional view of the FIG. 2.
Figure 4:
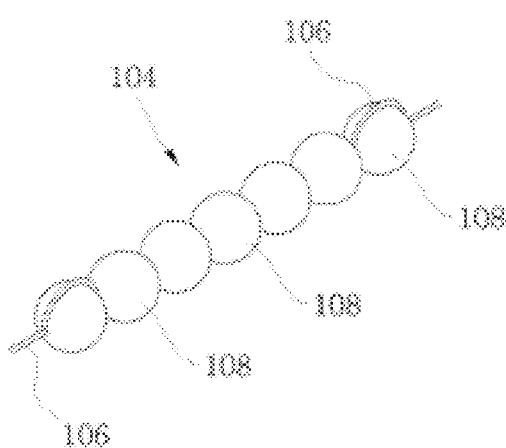
FIG. 4 is the main enlarged view of the FIG. 2.

Here, more specifically, the process to connect the suspension means (104) with the above-mentioned connecting means (106) by referring to the FIG. 3 or FIG. 4 is as follows:

First, once wind up the rotating ball (108) located at the first row, second row, third row, . . . , and nth row with the connecting means (106).

Then, insert the rotating ball (106) located at the second row, third row, and fourth row of the first row, second row, third row, . . . , and nth row into the connecting means (106).

And, once wind up the rotating ball (108) located at the fifth row of the first row, second row, third row, . . . , and nth row with the connecting means (106).

Then, insert the rotating ball (106) located at the sixth row, seventh row, eighth row, and ninth row of the first row, second row, third row, . . . , and nth row into the above-mentioned connecting means (106).

And, once wind up the rotating ball (108) located at the last (tenth) row of the end of the first row, second row, third row, . . . , and nth row with the connecting means (106).

Figure 6:
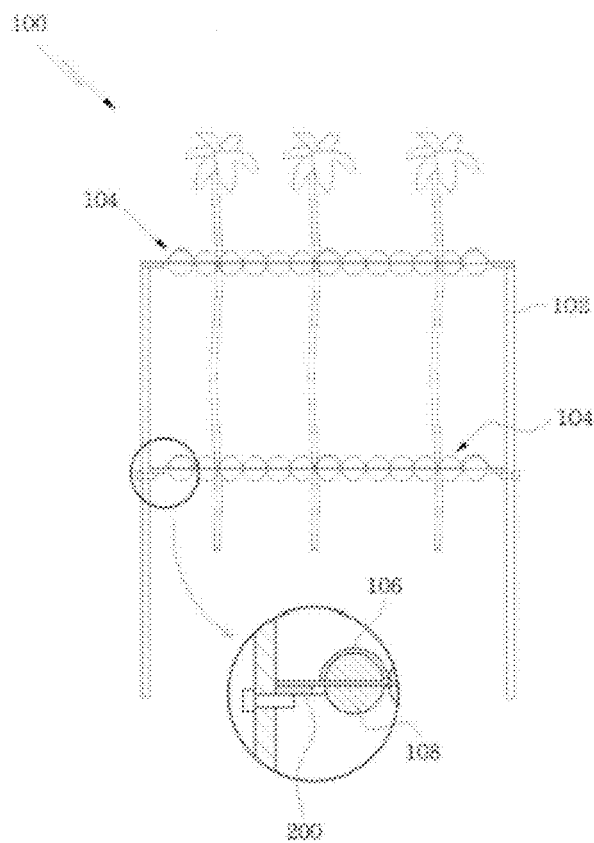
FIG. 6 is the drawing which depicts of the sectional view of another executed example of the suspension device for flower arrangements according to the subject invention.

As indicated above, if the assembly process of the suspension device for flower arrangements according to the subject invention is completed, As depicted in the FIG. 6, for example, insert flowers between the rotating ball (106) at the first row and the one (108) at the second row.

INDUSTRIAL AVAILABILITY

Therefore, the suspension device for flower arrangements according to the subject invention helps to maintain the state of a flower arranged once as it is by winding up the rotating ball located at the forefront, the rotating ball located at the end, and the rotating ball located at regular intervals between the forefront and the end with a connecting means to enhance its tensile force, and by making sure that the rotating balls cannot be rushed to the floor when the suspension means rotates.

Figure 5:
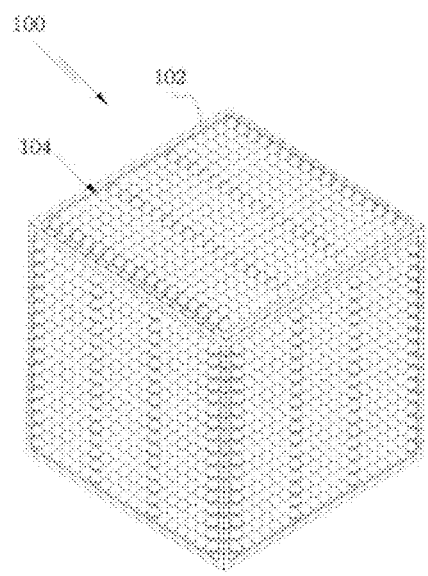
FIG. 5 is the drawing which depicts another executed example of the suspension device for flower arrangements according to the subject invention.

FIG. 5 is a drawing which depicts another executed example of the suspension device for flower arrangements according to the subject invention and includes, the box-typed frame (102) equipped with a space within it;

and the suspension device (104) which supports flowers to be installed at the upper, front, rear, left and right sides of the above-mentioned box-typed frame (102).

FIG. 6 is a drawing which depicts the sectional view of another executed example of the suspension device for flower arrangements according to the subject invention, and includes the box-typed frame (102) equipped with a space within it;

the suspension means (104) to support the flower to be installed and arranged on the upper part of the aforesaid box-typed frame (102);

and a sliding member of framework (200) equipped with a space within it, with it being located within the aforesaid box typed frame (102) to make sure that it can slide up and down.

Here, the above-mentioned sliding member of framework (200) includes the suspension means (104) to support the flower to be installed and arranged in the space of the above-mentioned sliding member of framework (200);

and the connecting means (106) to make sure that it cannot be separated from the sliding member of framework (200) when the suspension means (104) rotates, with it being connected with both the aforesaid sliding member of framework (200) and the suspension means (104).

In addition, the above-mentioned suspension means (104) to support flowers and the sliding member of framework (200) are able to enhance its tensile force in a matrix structure and are applicable to such forms of circle, triangle, quadrangle, etc.

The above-mentioned detailed explanations about the subject invention are just an example of the subject invention and is used for explaining about the subject invention, not for limiting the meanings or the scope of the subject invention as described in the scope of the patent claims. Thus, any person with ordinary skill in the art to which the subject invention pertains has to understand that various kinds of variations and other executed examples equal to the subject invention may exist from this. Therefore, the true scope of the technical protection of the subject invention must be determined by the technical ideas of the attached scope of the patent claims.

SEQUENCE LIST FREE TEXT

100: Suspension Device for Flower Arrangements
102: Frame
104: Suspension Means
106: Connecting Means
108: Rotating Ball
200: Sliding Member of Framework

What is claimed is:

1. A suspension device for flower arrangements comprising:
   a box-type frame (102);
   a suspension means (104) configured to support a flower to be arranged on an upper part of the box-type frame (102);
   a connecting means (106) configured to ensure that the suspension means (104) cannot be separated from the box-type frame (102) when the suspension means (104) rotates, the connecting means (106) connected with both the box-type frame (102) and the suspension means (104); and
   a sliding member (200) equipped with a space therewithin,
   wherein the suspension means (104) includes a plurality of rows, and each of the plurality of rows have a plurality of rotating balls (108) equipped with through tubes,
   wherein the connecting means (106) is wound around a front rotating ball (108) located at a front end of the plurality of rows, a rear rotating ball (108) located at a rear end of the plurality of rows, and an intermediate rotating ball (108) located at predetermined intervals between the front end and the rear end of the plurality of rows, wherein the sliding member (200) is located within the box-type frame (102) such that the sliding member (200) can slide up and down, wherein the suspension means (104) is accommodated in the space of the sliding member (200), and wherein the connecting means (106) is connected to the sliding member (200) such that the suspension means (104) cannot be separated from the sliding member (200) when the suspension means (104) rotates.

2. The suspension device of claim 1, wherein the connecting means is a wire.

3. The suspension device of claim 1, wherein the suspension means (104) and the sliding member (200) form a matrix-like structure.

* * * * *